United States Patent
Tyler et al.

(10) Patent No.: US 7,276,281 B2
(45) Date of Patent: *Oct. 2, 2007

(54) CONTAINERS PREPARED FROM LAMINATE STRUCTURES HAVING A FOAMED POLYMER LAYER

(75) Inventors: Warren C. Tyler, Tubac, AZ (US); Steven G. Taylor, Columbus, OH (US); Melvin L. Druin, Freehold, NY (US); Arthur W. Robichaud, Kittery, ME (US)

(73) Assignee: SIG Combibloc, Inc., Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/168,159

(22) Filed: Jun. 28, 2005

(65) Prior Publication Data

US 2005/0287345 A1   Dec. 29, 2005

Related U.S. Application Data

(63) Continuation of application No. 10/317,954, filed on Dec. 12, 2002, now Pat. No. 6,911,241.

(51) Int. Cl.
B32B 27/08 (2006.01)

(52) U.S. Cl. .............. 428/319.3; 428/319.1; 428/319.7; 428/349; 428/480; 428/483

(58) Field of Classification Search ............ 428/319.1, 428/319.3, 319.7, 349, 480, 483
See application file for complete search history.

(56) References Cited

U.S. PATENT DOCUMENTS

| | | | |
|---|---|---|---|
| 4,034,019 A * | 7/1977 | Habermeier | 528/289 |
| 4,578,297 A | 3/1986 | Duncan | |
| 4,832,775 A | 5/1989 | Park | |
| 4,882,208 A * | 11/1989 | Breitscheidel et al. | 428/17 |
| 5,462,794 A * | 10/1995 | Lindemann et al. | 428/317.1 |
| 5,492,741 A * | 2/1996 | Akao et al. | 428/35.2 |
| 5,744,056 A * | 4/1998 | Venkateshwaran et al. | 252/188.28 |
| 5,744,181 A | 4/1998 | Sornay | |
| 6,365,249 B1 | 4/2002 | Al Ghatta | |
| 6,911,241 B2 * | 6/2005 | Tyler et al. | 428/36.5 |

FOREIGN PATENT DOCUMENTS

| | | |
|---|---|---|
| JP | 02252527 A | 10/1990 |
| WO | WO97/02139 | 1/1997 |

* cited by examiner

Primary Examiner—Hai Vo
(74) Attorney, Agent, or Firm—Standley Law Group LLP (57) ABSTRACT

A laminate structure includes an internal layer of foamed polymer. The foamed polymer replaces a paperboard layer used in prior laminate structures. Built upon the foamed polymer are three layers of low density polyethylene (LDPE), a layer of aluminum foil, and a tie layer. The foamed polymer may be polyethylene terephthalate (PET), polypropylene, high density polyethylene HDPE, LDPE, polystyrene, compositions comprising any of these polymers, or any other suitable foamed polymer compositions. The first LDPE layer coats a first surface of the foamed polymer, and the second LDPE layer coats a second surface of the foamed polymer. The aluminum foil layer is applied atop the second LDPE layer. The exposed surface of the aluminum foil is then coated with the tie layer, which is then topped with a third layer of LDPE. A non-polar homogeneous heat seal may be created at a temperature ranging from 250° F. to 500° F.

11 Claims, 8 Drawing Sheets

CONTAINERS PREPARED FROM LAMINATE STRUCTURES HAVING A FOAMED POLYMER LAYER

PRIOR APPLICATION CROSS-REFERENCE

This application is a continuation of U.S. Ser. No. 10/317,954, filed Dec. 12, 2002, now U.S. Pat. No. 6,911,241, issued Jun. 28, 2005, which in turn claims benefit of priority from U.S. Ser. No. 09/130,291, filed Aug. 6, 1998, now abandoned. Both applications are incorporated by reference as if fully recited herein.

BACKGROUND AND SUMMARY OF THE INVENTION

The present invention relates generally to containers, and more particularly, to containers prepared from heat-sealable laminate structures that include a layer of foamed polymer. The heat-sealable laminate structures of the present invention may include barriers commonly used to prevent oxygen from being transmitted to the product and/or to prevent water loss from the product.

Paperboard, heat-sealable polyethylenes, aluminum foil, and/or barrier polymers such as an ethylene vinyl alcohol co-polymer (EVOH) are primary components of many known containers.

Heat-sealable polyethylenes are commonly used as the product-contact layer of many known containers to provide a water/water vapor barrier to the structure, but they may have a deleterious effect on some products such as citrus juices by absorbing product flavor components and/or aroma oils. In addition to eroding product quality, the absorption of these oils may cause decay of the heat seals of containers by stress-cracking the polyethylene to the extent that the liquid may penetrate the paperboard.

Container structures that use paperboard may have a number of shortcomings, including: deterioration of the paperboard if saturated by liquid; a low strength to weight ratio; and difficulty in folding or creasing. In some cases, paperboard does not collapse or compress to a smaller caliper as desired during conventional heat sealing. The paperboard may contain contaminating aromas, and it may contain microorganisms, either of which may require some form of raw edge protection to prevent product contamination. During heat sealing, the heat may cause water to be vaporized from the paperboard, resulting in de-lamination of polyethylene coatings.

For at least these reasons, a need exists to replace the paperboard in existing container structures with a material that: is impervious to liquids such as water and oils; has greater strength, flexibility, and durability at a lower cost and weight; is non-scalping with regard to aromas, flavors, and vitamins; may provide a better seal by flowing and compressing during heat sealing; may permanently retain creases uniformly with direction; may be formed into cartons of various shapes; and that eliminates the need for raw edge protection to prevent product contamination.

The present invention provides containers prepared from heat-sealable laminate structures, either with or without a barrier that include a layer of foamed polymer that satisfy some or all of these needs. Also, the foamed polymer layer of the present invention provides benefits such as the ability to specifically engineer it for caliper, density, cell size, and skin surface along with the opportunity to process the material either in the direction of the web or across the web without reducing the inherent strength of the material. For example, the foamed polymer layer may be compressed and/or collapsed to a smaller caliper in the seal area during heat sealing. In addition, the foamed polymer layer may be creased to a smaller caliper that may allow for shorter radius bends that cause less stress on the other layers of the laminate structure.

In preferred embodiments of the present invention, the layer of foamed polymer is impervious to liquids, and it is more flexible, durable, and resilient than paperboard. Additionally, the layer of foamed polymer may be easier to fold and crease than paperboard while offering improved compressibility. The strength to weight ratio of foamed polymers is also preferably greater than paperboard and, as a result, the present invention may allow the production of containers at a lower cost than paperboard containers that serve the same function.

When combined with a barrier layer in addition to the foamed polymer layer, the heat-sealable laminate structures of preferred embodiments provide oxygen barrier properties.

Finally, certain of the preferred embodiments offer the additional benefits of microwave heating and/or non-absorption of essential oils, flavors, or vitamins.

BRIEF DESCRIPTION OF THE DRAWINGS

In addition to the novel features and advantages mentioned above, other objects and advantages of the present invention will be readily apparent from the following descriptions of the drawings and preferred embodiments, in which.

DETAILED DESCRIPTION OF A PREFERRED EMBODIMENT

The present invention is directed to containers that are prepared from heat-sealable laminate structures that include a layer of foamed polymer. The containers of the present invention may be particularly useful as food and beverage containers. However, those skilled in the art should recognize that some embodiments of the present invention may be used as containers for practically any product or item. Those skilled in the art should also recognize that the laminate structures of the present invention may also be formed into structures other than containers. For instance, the laminate structures of the present invention may be formed into structures such as, but not limited to, baskets, drawers, open-air storage compartments, and other types of storage devices.

The containers of the present invention are preferably adapted to serve the same uses and purposes as known liquid packaging containers. For example, the containers of the present invention may be fitted, opened, and/or closed with conventional closure and/or opening devices including, but not limited to, pull tabs, caps, screw caps, pop-tops, the devices disclosed in U.S. Pat. Nos. 5,101,999, 5,639,018, and U.S. Design Pat. No. 331,877, and practically any other conventional closure and/or opening devices. The containers of the present invention may also be adapted to be pierced and opened by straws or other similar means. Additionally, it is preferred that the containers of the present invention may be torn open using substantially the same methods as those disclosed in U.S. Pat. Nos. 6,062,470, 6,098,874 and 6,241,646. Moreover, some embodiments of the present invention may be opened and closed in substantially the same way as traditional gable top paperboard cartons.

The laminate structures of the present invention include a layer of foamed polymer. The layer of foamed polymer may be manufactured by conventional techniques such as extrusion, and it may be one element of a co-extruded laminate. The layer of foamed polymer may be comprised of poly(ethylene terephthalate) (PET), high density polyethylene, low density polyethylene, polypropylene, polystyrene or new or used compositions comprising any of these polymers. The layer of foamed polymer may also be comprised of any other suitable foamed polymer compositions that possess similar physical characteristics.

U.S. Pat. No. 5,391,582 provides an example of a foamed polymer composition that may be utilized in some embodiments of the present invention. However, that patent does not teach how to make laminate structures or containers using this material. In addition, it does not recognize the shortcomings of paperboard laminate structures, the benefits of foamed polymer laminate structures, or the advantages of replacing the paperboard layer of known laminate structures with a foamed polymer layer. In addition, some embodiments of the invention taught in U.S. Pat. No. 5,391,582 may use recycled materials, although Food and Drug Administration regulations prohibit the use of recycled materials as a product-contact surface. Therefore, recycled materials may not be used as a product-contact surface for food and beverage containers of the present invention.

Containers made from the laminate structures of the present invention may be formed and filled by known manufacturing systems and techniques. For example, the containers of the present invention may be manufactured by carton forming and filling machines that use either a web or "card" form of the laminate structure.

For example, a laminate structure of the present invention may be manufactured in a web form using a laminating extruder that is commercially available from Egan Davis Standard of Somerville, N.J. A container of the present invention may be manufactured from a web laminate structure using a packaging machine such as the one disclosed in U.S. Pat. No. 4,580,392 which was assigned at issue to Tetra Pak International AB of Sweden.

A laminate structure of the present invention may be manufactured into a sleeve form using a machine that is commercially available from International Paper Box Machine Company, Inc. of Nashua, N.H. A container of the present invention may be manufactured from these sleeves using a packaging and filling machine such as one which is commercially available from SIG Combibloc GmbH of Germany. Another example of a sleeve packaging machine is one such as manufactured by the Evergreen Packaging Company, Inc. of Cedar Rapids, IA.

Figure 1:
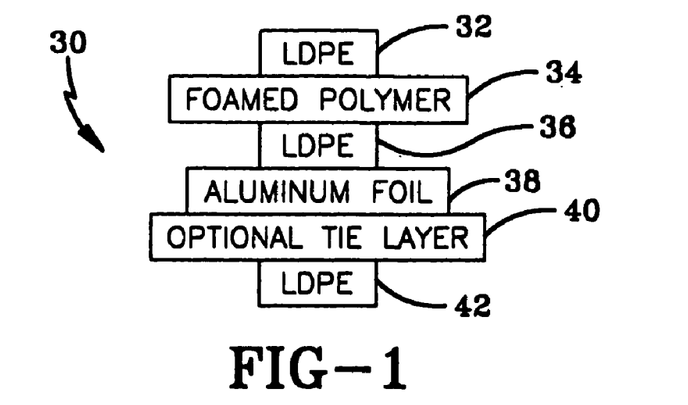
FIGS. 1 through 3 are cross-sectional views of three embodiments of a laminate structure of the present invention having an aluminum foil barrier layer.
Figure 2:
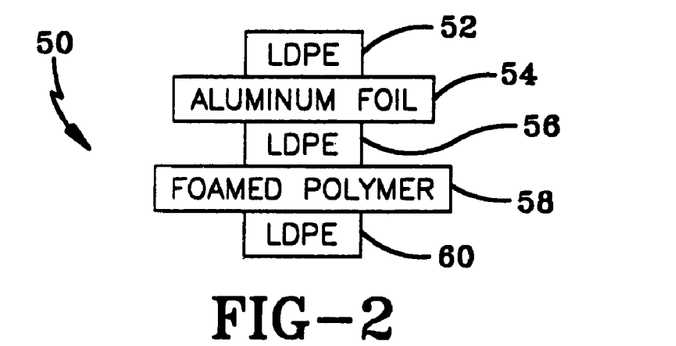
Figure 3:
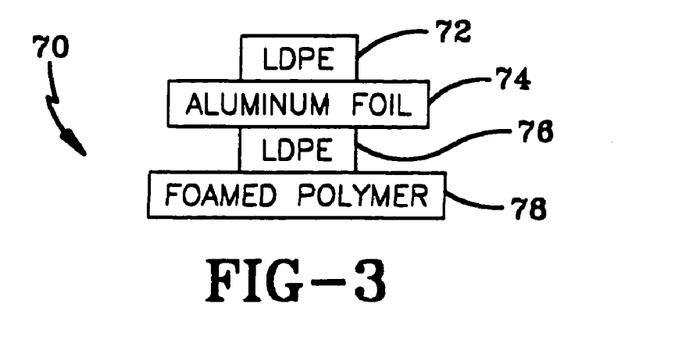

FIGS. 1 through 3 illustrate various embodiments of laminate structures of the present invention which include an aluminum foil barrier. In FIG. 1, the laminate structure 30 comprises a low density polyethylene (LDPE) layer 32, a layer of foamed polymer 34, a LDPE layer 36, a layer of aluminum foil 38, and a LDPE layer 42. Any commercial extrusion coating grade LDPE may be used for the LDPE layers of the present invention. The LDPE layer 32 may be extrusion coated on a first surface of the layer of foamed polymer 34, and the LDPE layer 36 may be extrusion coated so that a first surface thereof is in contact with a second surface of the layer of foamed polymer 34. The layer of aluminum foil 38 may be applied with a first surface of the aluminum on a second surface of the LDPE layer 36. A second surface of the aluminum foil is in contact with either LDPE layer 42 or a tie layer 40, which may be useful in preventing de-lamination, which may be caused by products having a high acid content. When the tie layer 40 is used, a first surface of the tie layer will be in contact with the second surface of the aluminum foil layer 38, with LDPE layer 42 on a second surface of the tie layer 40. Although any suitable adhesive material may be used to comprise the tie layer 40, it preferably comprises an ethylene-based copolymer. An example of a suitable adhesive tie layer is PRIMACOR, a co-polymer of ethylene and acrylic acid commercially available from The Dow Chemical Company of Midland, Mich. Other examples of suitable adhesive tie layers 40 are ethylene acrylic acid (EAA), ethylene methyl acrylate (EMA), SURLYN (an ionomer resulting from an acid neutralization of a co-polymer of ethylene and methacrylic acid, commercially available from E I DuPont of Wilmington, Del.), and polyethylene, depending on the application.

The laminate structure 50 of FIG. 2 is comprised of a LDPE layer 52, a layer of aluminum foil 54, a LDPE layer 56, a layer of foamed polymer 58, and a LDPE layer 60. In this embodiment, the LDPE layer 52 is coated on the outer surface of the layer of aluminum foil 54, and the LDPE layer 56 is coated on the inner surface of the layer of aluminum foil 54. The layer of foamed polymer 58 coats the inner surface of the LDPE layer 56. Finally, the LDPE layer 60 coats the inner surface of the layer of foamed polymer 58.

FIG. 3 illustrates another embodiment of a laminate structure that includes a layer of aluminum foil. As shown in FIG. 3, the laminate structure 70 is comprised of a LDPE layer 72, a layer of aluminum foil 74, a LDPE layer 76, and a layer of foamed polymer 78 which are applied in the order listed. The layer of foamed polymer 78 is preferably the product-contact surface. In order to substantially prevent the absorption of the essential oils, flavors, and vitamins of juices, the layer of foamed polymer 78 is preferably comprised of poly(ethylene terephthalate).

Figure 4:
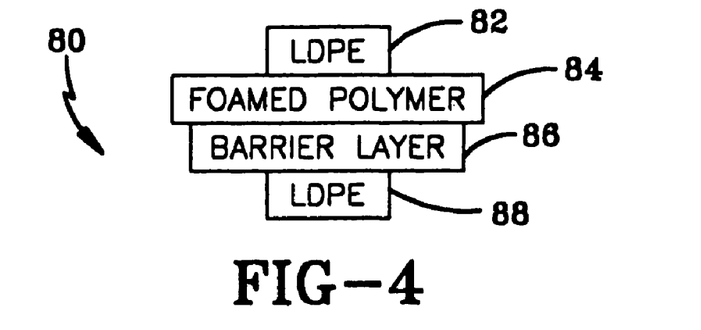
FIGS. 4 through 6 are cross-sectional views of three embodiments of a laminate structure of the present invention that is microwavable.
Figure 5:
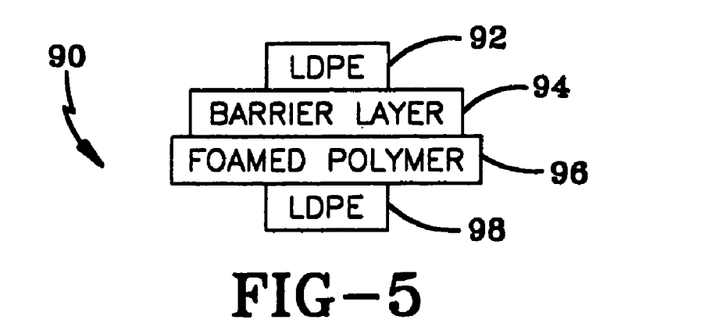
Figure 6:
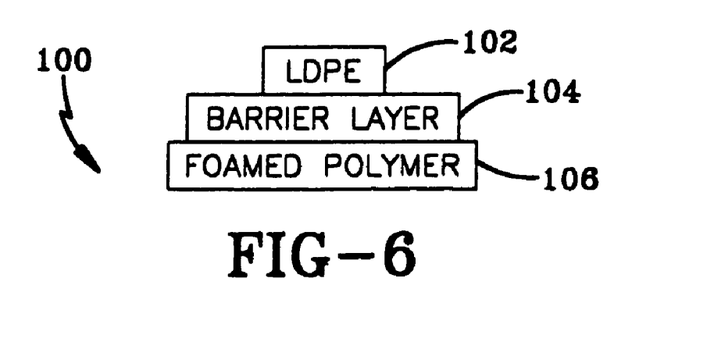

FIGS. 4 through 6 illustrate various embodiments of laminate structures of the present invention which are preferably microwaveable. In FIG. 4, the laminate structure 80 is comprised of a LDPE layer 82, a layer of foamed polymer 84, a barrier layer 86, and a LDPE layer 88 which secured together in the order listed. In FIG. 5, the laminate structure 90 is comprised of a LDPE layer 92, a barrier layer 94, a layer of foamed polymer 96, and a LDPE layer 98 which are coated in the order listed. The laminate structure 100 is comprised of a LDPE layer 102, a barrier layer 104, and a layer of foamed polymer 106 which are applied in the order listed.

The barrier layer of the present invention may be comprised of practically any suitable barrier material that is adapted to substantially prevent the transmission of oxygen or oxygen and water. For instance, the barrier layer of the present invention may be comprised of barrier material including, but not limited to, aluminum foil, polyethylene terephthalate, glycol-modified polyethylene terephthalate, acid-modified polyethylene terephthalate, EVOH, polymers of meta-xylenediamine (MXD6), polyvinylidene chloride (PVDC), polyethylene naphthalate (PEN), liquid crystal polymers like polyester liquid crystals, compositions comprising any of these polymers, or other similar materials, polymers, or compositions. EVOH is available from the Eval Company of America. The use of a polymer as the barrier layer preferably allows the packaging or container to be suitable for microwave applications.

Figure 24:
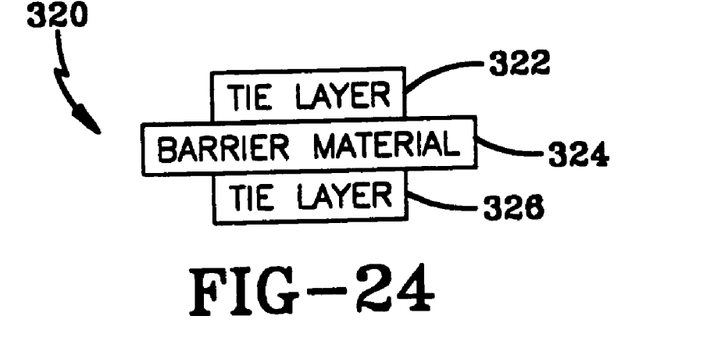
Figure 25:
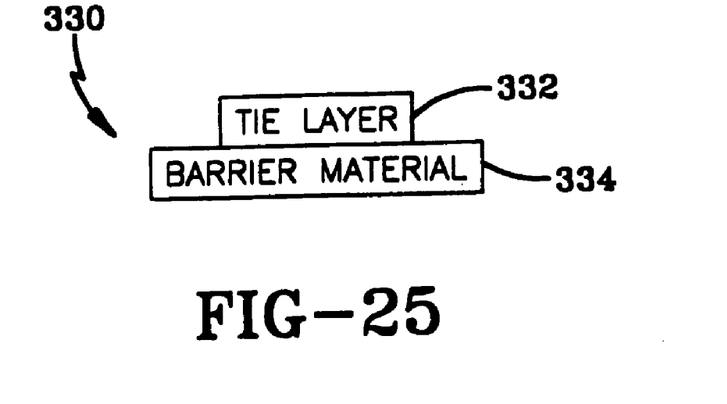

FIGS. 24 and 25 illustrate some examples of barrier layers. Those of ordinary skill in the art should recognize that the barrier layer of the present invention may be a multi-layer structure such as a multi-layer coextrusion. For example, either surface of the barrier material may be coated with polymer layers, tie layers, or combinations thereof. FIG. 24 illustrates an example of a barrier layer 320 that is a multi-layer structure. In this embodiment, the outer surface of the barrier material 324 is coated by an outer adhesive tie layer 322, and the inner surface of the barrier material 324 is coated by an inner adhesive tie layer 326. FIG. 25 illustrates another embodiment a barrier layer 330 that is a multi-layer structure. In this embodiment, the barrier layer 330 is comprised of a layer of barrier material 334 and an adhesive tie layer 332. The adhesive tie layer 332 coats the outer surface of the layer of barrier material 334.

Figure 7:
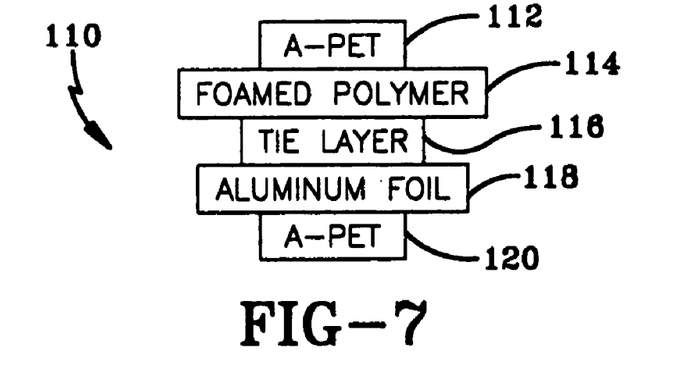
FIGS. 7 through 9 are cross-sectional views of three embodiments of a laminate structure of the present invention having at least one amorphous poly(ethylene terephthalate) layer.
Figure 8:
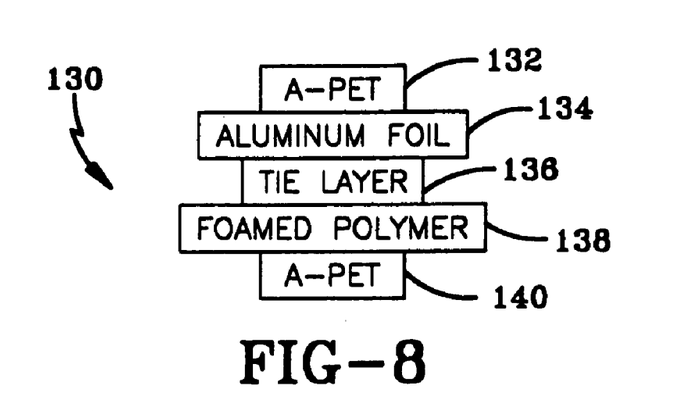
Figure 9:
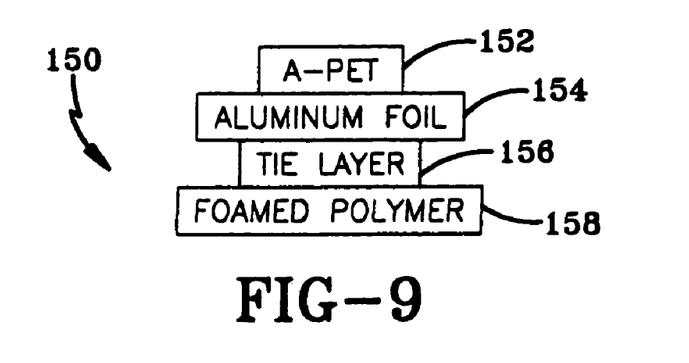

FIGS. 7 through 9 show various embodiments of laminate structures of the present invention which include a layer of aluminum foil and at least one layer of amorphous poly (ethylene terephthalate) (A-PET). The laminate structure 110 of FIG. 7 is comprised of an A-PET layer 112, a layer of foamed polymer 114, a tie layer 116, a layer of aluminum foil 118, and an A-PET layer 120 which are applied in the order listed. In FIG. 8, the laminate structure 130 includes an A-PET layer 132, a layer of aluminum foil 134, a tie layer 136, a foamed polymer layer 138, and an A-PET layer 140 which are secured together in the order listed. Finally, FIG. 9 illustrates a laminate structure 150 which is comprised of an A-PET layer 152, a layer of aluminum foil 154, a tie layer 156, and a layer of foamed polymer 158 which are coated in the order listed.

A-PET may serve many purposes. For instance, information may be printed on a layer of A-PET using conventional printing techniques. In addition, A-PET may substantially prevent the scalping of the essential flavors, oils, and vitamins of juices when it is used as the product-contact surface as shown in FIGS. 7 and 8.

Figure 10:
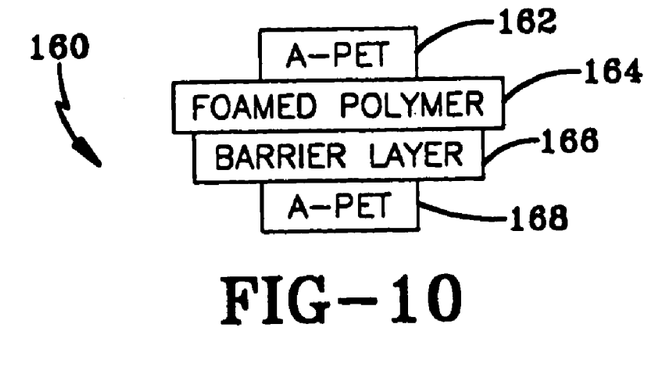
FIGS. 10 through 12, 24 and 25 are cross-sectional views of exemplary barrier structures used in the present invention.
Figure 11:
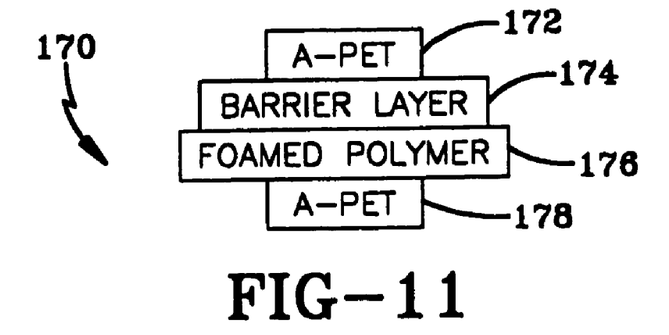
Figure 12:
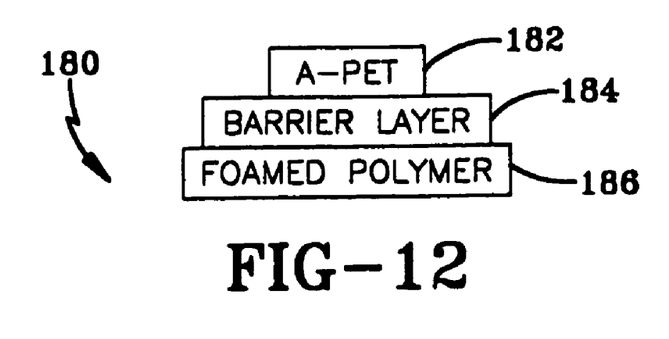

FIGS. 10 through 12 show various embodiments of barrier laminate structures. In particular, FIG. 10 illustrates a laminate structure 160 which is comprised of an A-PET layer 162, a foamed polymer layer 164 such as a layer of foamed poly(ethylene terephthalate), a barrier layer 166, and an A-PET layer 168 which are coated in the order listed. The laminate structure 170 of FIG. 11 includes an A-PET layer 172, a barrier layer 174, a foamed polymer layer 176, and an A-PET layer 178 which are secured together in the order listed. Finally, FIG. 12 shows a laminate structure 180 which is comprised of an A-PET layer 182, a barrier layer 184, and a foamed polymer layer 186 which are stacked in the order listed.

Figure 13:
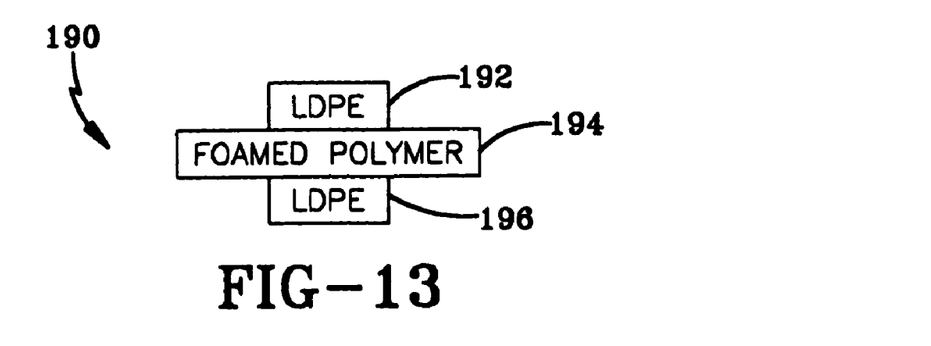
FIGS. 13 through 16, 22 and 23 are cross-sectional views of exemplary non-barrier laminate structures used in the present invention.
Figure 14:
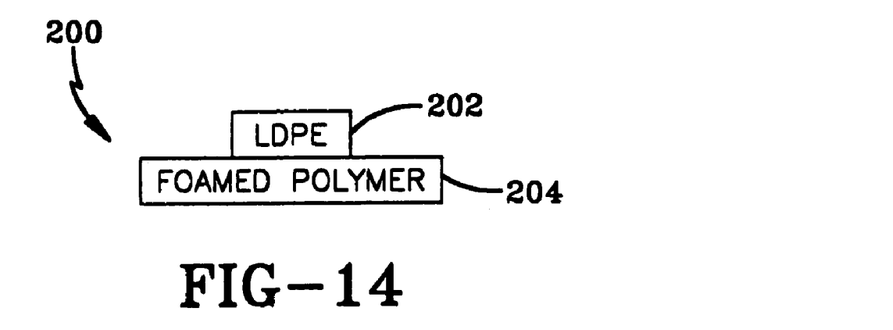
Figure 15:
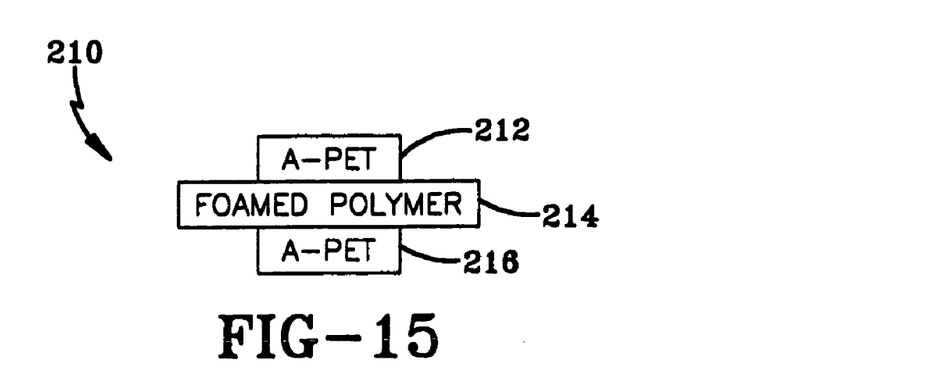
Figure 16:
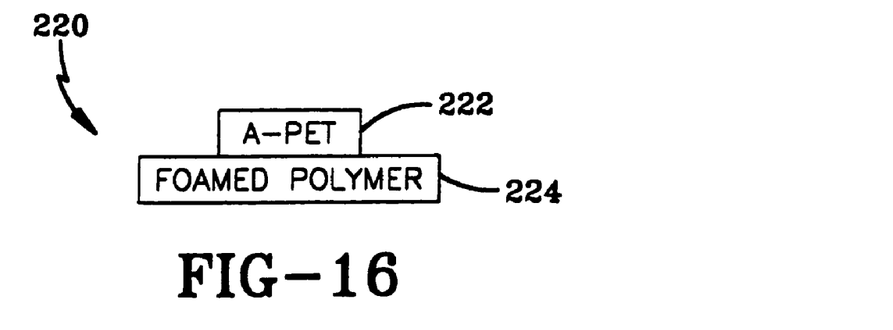
Figure 22:
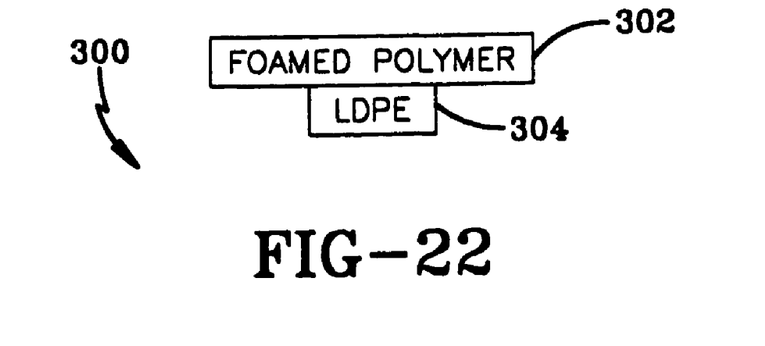
Figure 23:
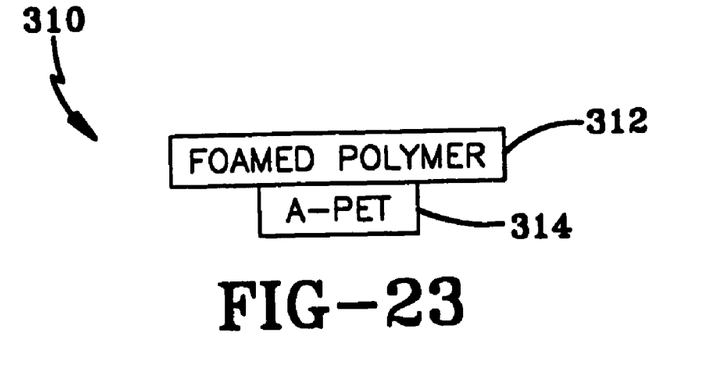

FIGS. 13 through 16, 22, and 23 show various embodiments of non-barrier laminate structures. The laminate structure 190 of FIG. 13 is comprised of a LDPE layer 192, a foamed polymer layer 194, and a LDPE layer 196 which are coated in the order listed. The laminate structure 200 of FIG. 14 includes a LDPE layer 202 that is secured to a foamed polymer layer 204. In FIG. 15, the laminate structure 210 comprises an A-PET layer 212, a foamed polymer layer 214, and an A-PET layer 216 which are applied in the order listed, and laminate structure 220 of FIG. 16 includes an A-PET layer 222 which is coated on a foamed polymer layer 224. FIG. 22 illustrates a laminate structure 300. The laminate structure 300 is comprised of a foamed polymer layer 302 that is applied on the outer surface of a LDPE layer 304. Finally, FIG. 23 shows a laminate structure 310 which comprises a foamed polymer layer 312 coated on the outer surface of an A-PET layer 314.

Figure 17:
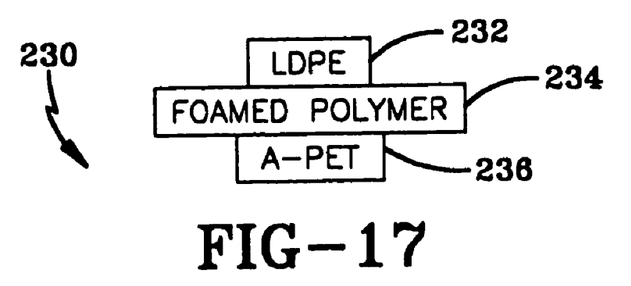
FIGS. 17 through 21 are cross-sectional views of exemplary laminate structures of the present invention where one outer surface of the laminate is low density polyethylene and the other outer surface is amorphous poly(ethylene terephthalate).
Figure 18:
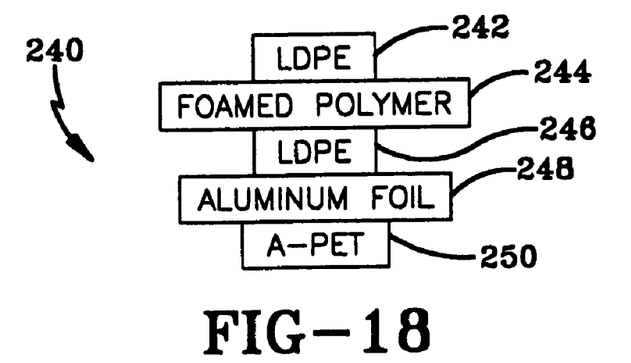
Figure 19:
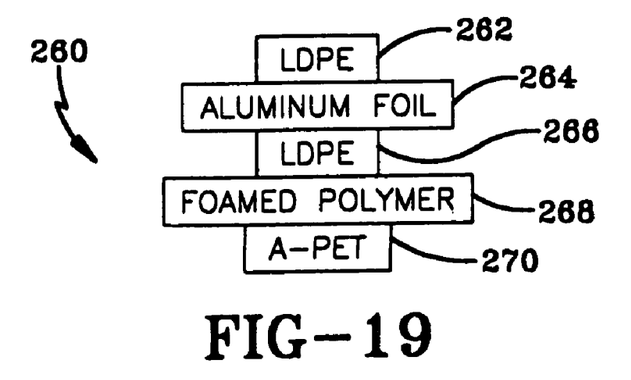
Figure 20:
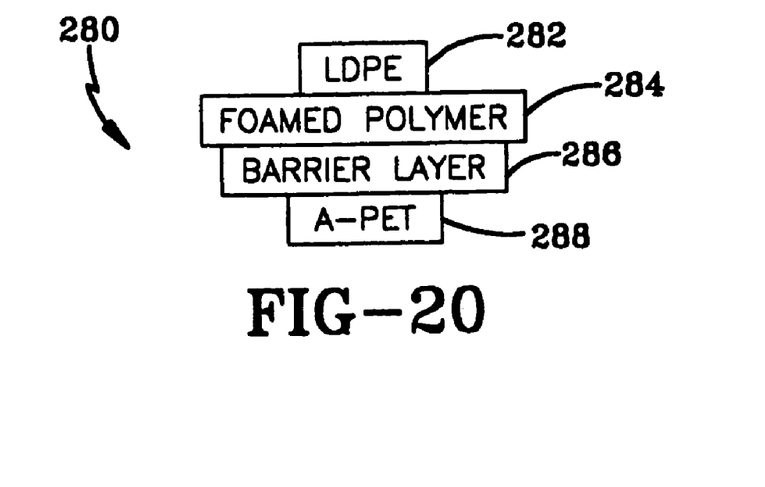
Figure 21:
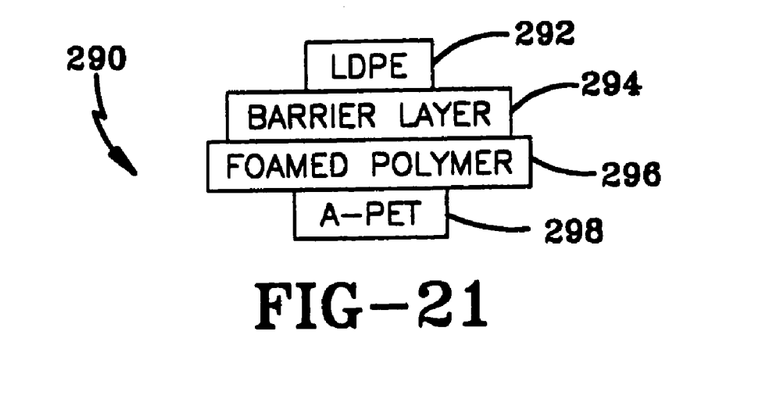

FIGS. 17 through 21 show various embodiments of laminate structures that have an outermost LDPE layer and an A-PET product-contact surface. In FIG. 17, the laminate structure 230 is comprised of an LDPE layer 232, a foamed polymer layer 234, and an A-PET layer 236 which are coated in the order listed. The laminate structure 240 of FIG. 18 includes a LDPE layer 242, a foamed polymer layer 244, a LDPE layer 246, a layer of aluminum foil 248, and an A-PET layer 250 which are applied in the order listed. In FIG. 19, the laminate structure 260 comprises a LDPE layer 262, a layer of aluminum foil 264, a LDPE layer 266, a foamed polymer layer 268, and an A-PET layer 270 which are secured together in the order listed. A laminate structure 280 is illustrated in FIG. 20. The laminate structure 280 includes a LDPE layer 282, a foamed polymer layer 284, a barrier layer 286, and an A-PET layer 288 which are applied in the order listed. Finally, the laminate structure 290 of FIG. 21 comprises a LDPE layer 292, a barrier layer 294, a foamed polymer layer 296, and an A-PET layer 298 which are coated in the order listed.

The laminate structures of the present invention may be heat sealed by conventional equipment ranging from about 250 degrees Fahrenheit to about 500 degrees Fahrenheit such that a non-polar homogeneous heat seal is created. For example, the laminate structures of the present invention may be heat sealed ultrasonically, by flame sealing, by hot air plus pressure (convection), and/or by induction. As is well known in the art, induction is a preferred method for heat sealing laminate structures of the present invention that include a layer of aluminum foil.

EXAMPLE

A card laminate structure was manufactured into a sleeve form using a sleeve forming machine that is commercially available from International Paper Box Machine Company, Inc. of Nashua, N.H. The laminate structure was comprised of an outer LDPE layer, a layer of foamed polyethylene terephthalate, a laminating LDPE layer, a layer of aluminum foil, a tie layer of PRIMACOR, and an inner LDPE layer which were coated in the order listed. Table 1 shows the coat weights of the layers of the laminate structure:

TABLE 1

| Material | Coat Weights |
|---|---|
| 1. First surface LDPE layer | 18 g/m² |
| 2. Foamed PET | 120 g/m² |
| 3. Internal LDPE layer | 20 g/m² |

TABLE 1-continued

| Material | Coat Weights |
|---|---|
| 4. Aluminum foil | 18 g/m² |
| 5. PRIMACOR | 4 g/m² |
| 6. Second surface LDPE layer | 51 g/m² |

The sleeve form of the laminate structure was formed into an aseptic container using a sleeve packaging and filling machine that is commercially available from SIG Combibloc GmbH of Germany. The sleeve packaging and filling machine effectively sterilized and heat sealed the aseptic container. The thicknesses and edges of the seals were vastly thinner when compared to those of comparable aseptic containers that are prepared from paperboard laminate structures. For this example, the aseptic container produced was of a lower weight than comparable aseptic containers that are prepared from paperboard laminate structures.

Although specific coat weights and specifications for the various layers have been provided in the example, those skilled in the art should recognize that the thicknesses, coat weights, and specifications of the layers may vary depending on the packaging application. For example, the thicknesses of the layers of the present invention may be comparable to the thicknesses of the layers of known paperboard laminate structures that may serve substantially the same uses and purposes.

Additionally, various conventional coating techniques may be utilized to apply the layers of the laminate structures of the present invention. For example, a foamed polymer layer may be flame treated and then a layer of molten LDPE, barrier material, or A-PET may be coated onto a surface of the foamed polymer layer by extrusion coating. In addition, a tie layer may be extrusion laminated onto the surface of the layer to which it is to be secured. Finally, aluminum foil may be adhesive laminated with a LDPE layer or an A-PET layer. However, it should be recognized that the present invention may be achieved by any suitable technique for applying the layers such as, but not limited to, extrusion, coextrusion, adhesive lamination, single layer films, and multi-layer films.

An intention of the inventors is to patent containers prepared from laminate structures that include a layer of foamed polymer. Obviously, it is not reasonable to expressly describe every possible embodiment of foamed polymer laminate structures. Accordingly, the preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A laminate structure, excluding paperboard, comprising:
   a core comprising a foamed polymer material, the core having opposing first and second surfaces;
   an oxygen barrier comprising a barrier material for substantially preventing the transmission of oxygen therethrough, the oxygen barrier having opposing first and second surfaces, the first surface of the oxygen barrier facing the first surface of the core;
   a layer of amorphous poly(ethylene terephthalate) (APET) having first and second surfaces, the first surface thereof facing and joined to the second surface of the core; and
   two layers of low density polyethylene (LDPE), the first LDPE layer interposed between and joining the respective first surfaces of the core and the oxygen barrier and the second LDPE layer joined to the second surface of the APET layer.

2. The laminate structure of claim 1, wherein:
   the foamed polymer is selected from the group consisting of: styrenic polymers, olefinic polymers, and polyester polymers.

3. The laminate structure of claim 2, wherein:
   the barrier material comprises a layer of aluminum foil.

4. The laminate structure of claim 3, further comprising:
   a layer of LDPE, having first and second surfaces, the first surface facing and joined to the second surface of oxygen barrier.

5. The laminate structure of claim 2, wherein:
   the oxygen barrier is a multi-layer structure; and
   at least one surface of the barrier material is coated with at least one of a polymer layer, a tie layer, and a combination thereof.

6. The laminate structure of claim 5, further comprising:
   a layer of LDPE, having first and second surfaces, the first surface facing and joined to the second surface of oxygen barrier.

7. The laminate structure of claim 1, wherein:
   the barrier material comprises a layer of aluminum foil.

8. The laminate structure of claim 7, further comprising:
   a layer of LDPE, having first and second surfaces, the first surface facing and joined to the second surface of oxygen barrier.

9. The laminate structure of claim 1, wherein:
   the oxygen barrier is a multi-layer structure; and
   at least one surface of the barrier material is coated with at least one of a polymer layer, a tie layer, and a combination thereof.

10. The laminate structure of claim 9, further comprising:
    a layer of LDPE, having first and second surfaces, the first surface facing and joined to the second surface of oxygen barrier.

11. The laminate structure of claim 1, further comprising:
    a layer of LDPE, having first and second surfaces, the first surface facing and joined to the second surface of oxygen barrier.

* * * * *